United States Patent
Laurent et al.

(10) Patent No.: US 7,169,503 B2
(45) Date of Patent: Jan. 30, 2007

(54) BASIC FUEL CELL ELEMENT LIMITING METHANOL CROSSING THROUGH THE ELECTROLYTE

(75) Inventors: Jean-Yves Laurent, Claix (FR); Didier Marsacq, Grenoble (FR); Christel Roux, St Quentin sur Isene (FR); Christine Nayoze, Fontaine (FR)

(73) Assignee: Commissariat a l'Energie Atomique, Paris (FR)

( * ) Notice: Subject to any disclaimer, the term of this patent is extended or adjusted under 35 U.S.C. 154(b) by 361 days.

(21) Appl. No.: 10/481,490

(22) PCT Filed: Apr. 18, 2003

(86) PCT No.: PCT/FR03/01250

§ 371 (c)(1),
(2), (4) Date: Oct. 23, 2004

(87) PCT Pub. No.: WO03/092092

PCT Pub. Date: Nov. 6, 2003

(65) Prior Publication Data

US 2005/0042499 A1    Feb. 24, 2005

(30) Foreign Application Priority Data

Apr. 23, 2002  (FR) .................. 02 05062

(51) Int. Cl.
*H01M 4/86* (2006.01)
*H01M 8/00* (2006.01)
*H01M 2/00* (2006.01)

(52) U.S. Cl. .................. 429/44; 429/12; 429/34; 429/41

(58) Field of Classification Search .......... 429/12, 429/30, 34, 44, 42, 41
See application file for complete search history.

(56) References Cited

U.S. PATENT DOCUMENTS

2003/0228508 A1 * 12/2003 Champion et al. ............ 429/30

FOREIGN PATENT DOCUMENTS

DE    198 03 132    4/1999

(Continued)

OTHER PUBLICATIONS

Copy of French Search Report corresponding to French application FR 0205062.

(Continued)

*Primary Examiner*—Patrick Joseph Ryan
*Assistant Examiner*—Thomas H. Parsons
(74) *Attorney, Agent, or Firm*—Thelen Reid Brown Raysman & Steiner LLP

(57) ABSTRACT

The PEM (Proton Exchange Membrane) type basic fuel cell element has a high efficient when only the protons migrate towards the cathode, excluding any other species that could react with the cathode. It is composed mainly of a silicon substrate (25) crossed by pipes (26), terminating on the bottom of a dish. The cathode (20) is deposited on the bottom of this dish, covered by a first layer of electrolyte (23). An internal part (32) of the anode is embedded between two layers (23) of electrolyte, while an external part (31) is placed on the upper part of it. The internal part (32) is preferably a grid or a foam such that fuel migrating towards the cathode can be consumed and protons can pass through.

9 Claims, 1 Drawing Sheet

FOREIGN PATENT DOCUMENTS

Figure 1:
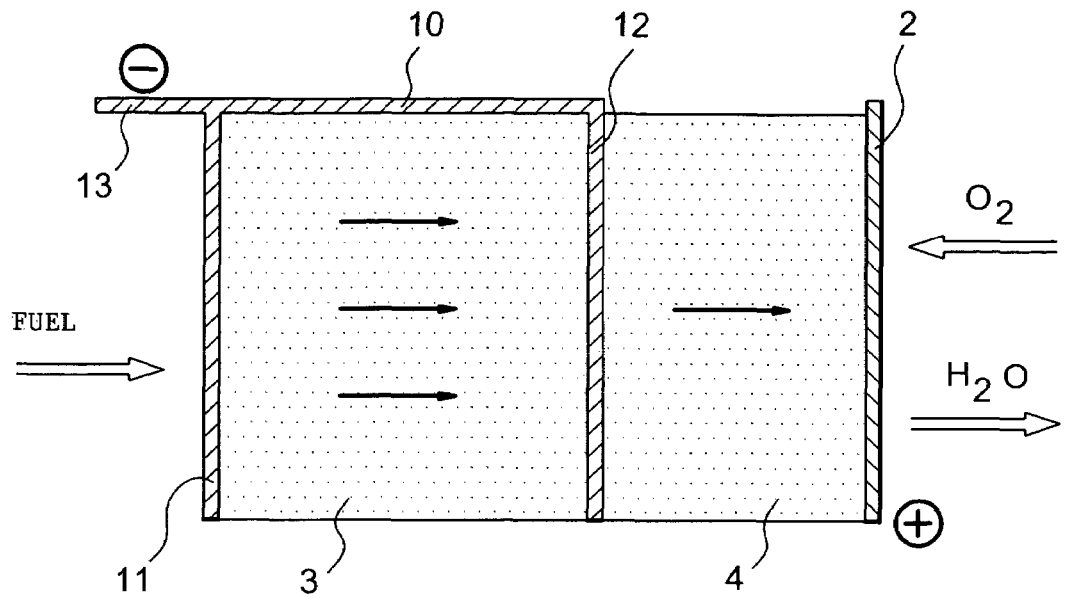

| | | |
|---|---|---|
| DE | 19803132 C1 | 4/1999 |
| DE | 198 59 765 | 6/2000 |
| DE | 19859765 C | 6/2000 |
| WO | WO 99/39398 | 8/1999 |
| WO | WO 99/40237 | 8/1999 |
| WO | WO9940237 A | 8/1999 |
| WO | WO 01/37357 | 5/2001 |
| WO | WO0137357 A | 5/2001 |

OTHER PUBLICATIONS

Copy of English translations for DE 198 01332, DE 198 59765, WO 99 40237, WO 01 37357.

* cited by examiner

BASIC FUEL CELL ELEMENT LIMITING METHANOL CROSSING THROUGH THE ELECTROLYTE

FIELD OF THE INVENTION

This invention relates to the field of Proton Exchange Membrane (PEM) type fuel cells, and particularly Direct Methanol Fuel Cells (DMFC) type cells using methanol or another alcohol as a fuel. It applies particularly to fuel cells designed to supply power to portable equipment, in other words lightweight and compact equipment.

PRIOR ART AND PROBLEM THAT ARISES

Fuel cells usually use hydrogen as the fuel and oxygen as the oxidant. In the case of fuel cells designed to supply power to portable equipment, the volume occupied by the fuel must be minimal. Since the energy density of liquid fuels is generally greater than the density of hydrogen, they will be preferred as the fuel.

As in other fuel cells, the fuel is intended to be catalytically oxidized at the anode to create protons, electrons and successive oxidation products that can cause the creation of carbon dioxide. The electrolyte, usually composed of a protonic conducting membrane of the Nafion$^{(R)}$ type, then transfers protons towards the cathode to react with oxygen and form water. The major difficulty of this type of fuel cell is permeation of fuel through the electrolytic membrane to react with oxygen directly at the cathode. This reaction has two major consequences, firstly creation of hybrid voltage at the cathode, lowering the global voltage of the cell, and excessive consumption of fuel reducing the operating endurance of the assembly. Furthermore, it is practically impossible to avoid transverse migration of fuel in the electrolyte, since the protonic conductor contains an aqueous system to facilitate the passage of protons, and the fuel diffuses very quickly in this aqueous system in which it is miscible.

International application WO-01/37357 describes fuel cells with a silicon substrate in which a sealed barrier made of palladium, niobium, tantalum or vanadium is positioned between the anode and the cathode, and is preferably connected to the cathode. This principle is purely physical, in other words this film forms an obstacle to the route followed by methanol. Furthermore, this process has two major disadvantages as follows:
- deceleration of the migration of protons caused by an absorption/diffusion/desorption reaction in the metallic membrane;
- blocking of water movements in the membrane and consequently creation of drier zones, that are therefore less ionically conducting.

The purpose of the invention is to overcome these disadvantages and to present a different concept to prevent methanol from passing through the electrolyte layer as far as the cathode, while increasing the efficiency of the fuel cell by using methanol present in the electrolyte.

SUMMARY OF THE INVENTION

To achieve this, the main purpose of the invention is a basic fuel cell element comprising an electrolyte between a cathode and an anode.

According to the invention, the anode comprises an internal part placed embedded in the electrolyte and electrically connected to an external part in contact on one only side with the electrolyte.

Preferably, the electrolyte is in the form of a film or in the form of a coat.

This internal part may be composed of several coats of different materials.

It is preferably parallel to the external part.

The internal part may also be composed of at least one foam.

The internal part may preferably be made in the form of one or several grids.

In one preferred embodiment of the basic element according to the invention, the fuel is an alcohol, preferably chosen from among ethanol, methanol and glycol ethylene.

LIST OF FIGURES

Figure 2:
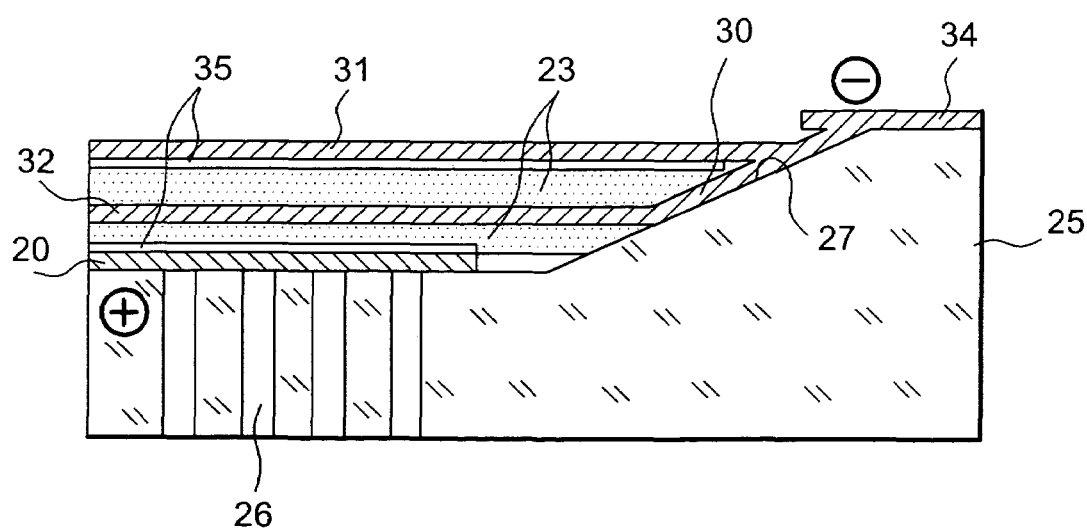

The invention and its various specific features will be better understood after reading the following description accompanied by two figures:

FIG. 1 is a sectional view showing the general principle of the basic element according to the invention; and FIG. 2 is a partial sectional view showing a particular embodiment of the basic element according to the invention.

DETAILED DESCRIPTION OF AN EMBODIMENT OF THE INVENTION

The manner of achieving the objective mentioned above always consists of making the fuel react in the electrolyte before it reaches the cathode.

FIG. 1 shows a sectional view of a portion of the basic element that clearly illustrates the principle used. The electrolyte reference 3 or 4 occupies most of the element. On one side, in other words at the right, there is a cathode 2 in a conventional position on the outside surface of the right part of the electrolyte 4. The external part 11 of the anode is at the left part of the external surface of the electrolyte 3. The anode is also composed of an internal part 12 parallel to the external part 11 and embedded in the electrolyte. It is electrically connected to the external part through a connection 10. This assembly composed of the connection 10, the external part 11 and the internal part 12, is electrically connected to a connector 13 located outside the element. It is important to note that the internal part 12 of the anode is formed of a grid, rather than being composed of a plate or a solid layer forming a mechanically uncrossable barrier. The grid may be in several different forms, the meshes may be round, square, hexagonal or other shapes, allowing the passage of protons and water movements that balance the water content of the membrane. The anode and particularly the grid composed of the internal part 12, must be made of a material enabling oxidation of the fuel, such as palladium, platinum or ruthenium, or others. Therefore this internal part enables the fuel that did not react at the external anode to react at this level, so that the fuel quantity reaching the cathode is minimal.

The electrolyte may be any protonic conducting polymer, for example Nafion$^{(R)}$. The electrodes are preferably based on platinum. The fuel may be an alcohol, for example such as ethanol, methanol, glycol ethylene.

The arrows shown inside the electrolyte 3 and 4 show how fuel migrates from the anode to the cathode, and illustrate the limitation of the migration phenomenon by the presence of the internal part of the anode. The proton reaction with oxygen that produces water takes place adjacent to the cathode 2.

Only the internal part 12 of the anode is shown in the figures. However, several internal parts 12 could be electrically connected to the external part 11.

FIG. 2 shows a partial section through a more specific embodiment of a basic fuel cell element, and particularly showing the manufacturing process.

This is done using a silicon substrate 25 to support the assembly. This assembly, shown at the left of the figure, is provided with oxygen feed pipes 26, perpendicular to the upper surface and on an inclined plane 27. Therefore the entire silicon substrate 25 forms a dish inside which the assembly must be made.

The first manufacturing phase of the assembly consists of etching one or several dishes on a surface of the silicon substrate 25. FIG. 2 is a sectional view showing the shape of the edge of one of these dishes. These dishes are machined by chemical aggression, and more particularly by a basic attack, for example using hot potassium hydroxide.

The second phase consists of depositing the cathode 20 composed of a metallic collector, by vapor phase deposition on the bottom of the dish in the substrate 25. The thickness of the cathode 20 is of the order of 1 micrometer.

The third operation consists of depositing an active layer 35 on the cathode 20 by applying a coating, to catalyze the oxygen reduction reaction. This active layer 35 is a mix of platinum-coated graphite and a PVDF binder (a poly-vinylidene fluoride binder). This layer is a few micrometers thick.

The fourth phase consists of depositing a first part of the electrolyte 23 that must cover the first active layer 35 as far as the edge of the dish formed by the inclined plane 27. The electrolyte 23 is a Nafion$^{(R)}$ solution formed by applying a coating. This layer is approximately 20 µm thick. The spreading may be done by centrifuging, followed by drying. The electrolyte 23 may also be composed of one of the following products: polyimides, sulfoned polyethersulfones, sulfoned polystyrenes and sulfoned derivatives of them, sulfoned polyethercetones and sulfoned derivatives of them, sulfoned polybenzoxazoles, polybenzimidazoles and their derivatives, polyarylenes such as paraphenylenes and polyparaxylylenes and sulfoned derivatives of them. It may be deposited in the form of a film.

The next step consists of depositing the internal part 32 of the anode, which in this example is composed of a single layer that is not leak tight, but may be composed of several layers of different materials. It is deposited in the vapor phase (PVD). This deposit is made at a pressure of 3 mbars in an argon plasma with mechanical masking to make the grid. This internal part 32 of the anode continues on the side of the dish, more precisely on the inclined plane 27, by an extension of the plate obtained by the same deposition forming an electrical connection 30 with the external part 31 also forming the anode. This gives electrical homogeneity of the entire anode.

The next step consists of depositing the second part of the electrolyte 23 in the same way as the first part.

The next step is to deposit the active layer 35 at the anode end by applying a coating composed of platinum-coated carbon mixed with Nafion$^{(R)}$. The external part 31 of the anode is obtained by plasma cathodic sputtering. It continues to the edge of the dish, in other words as far as the connection 30. Outside the assembly, this layer is prolonged to form a connector 34 deposited by vapor phase deposition, made of the same material as the internal part 32 of the anode. Thus the dish shape of the substrate 25 makes it possible to connect two anode layers composed of the external part 31 and the internal part 32 to each other, and to form the connection 30.

Only one internal part 32 is shown in the example shown in FIG. 2. It is easily possible to envisage that several successive internal parts could be inserted in a larger electrolytic layer.

The depositions of the various layers can also be made by vapor phase deposition, chemically, by sputtering, by coating, by dipping or by centrifuging.

In particular, this invention is applicable to fuel cell systems operating with methanol as fuel or with another liquid or gaseous fuel that could migrate through the electrolyte used. It could also be used for batteries using hydrogen as fuel in the case of very thin membranes, with excessive permeability to gasses.

The invention claimed is:

1. Basic fuel cell element comprising an electrolyte (3, 23) between an anode and a cathode:
   characterized in that the anode comprises an internal part (12, 32) embedded in the electrolyte (3, 23) and electrically connected to an external part (11, 31) in contact on one side only with the electrolyte (23).

2. Basic fuel cell element according to claim 1, characterized in that the electrolyte (3, 23) is in the form of a film.

3. Basic fuel cell element according to claim 1, characterized in that the electrolyte (3, 23) is in the form of a coat.

4. Basic fuel cell element according to claim 1, characterized in that the internal part (12, 32) is preferably parallel to the external part (31) of the anode.

5. Basic fuel cell element according to claim 1, characterized in that the internal part (32) is composed of at least one grid.

6. Basic fuel cell element according to claim 1, characterized in that the internal part (12, 32) is composed of at least one foam.

7. Basic fuel cell element according to one of the previous claims, characterized in that the internal part (32) is composed of several layers of different materials.

8. Basic element according to claim 1, characterized in that the fuel is an alcohol.

9. Basic element according to claim 8, characterized in that the alcohol is chosen from among ethanol, methanol and glycol ethylene.

* * * * *